United States Patent Office 3,472,806
Patented Oct. 14, 1969

3,472,806
NOVEL, AROMATICALLY - SUBSTITUTED POLY (VINYLENE) POLYMERS AND THEIR PRODUCTION
John M. Hoyt and Karl Koch, Cincinnati, Ohio, assignors to National Distillers and Chemical Corporation, a corporation of Virginia
No Drawing. Filed Aug. 8, 1966, Ser. No. 570,771
Int. Cl. C08g 33/00
U.S. Cl. 260—37                    13 Claims

ABSTRACT OF THE DISCLOSURE

Novel soluble, tractable aromatically-substituted poly(vinylene) polymers having the formula

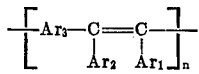

wherein $Ar_1$ and $Ar_2$ are monovalent aromatic radicals, $Ar_3$ is a divalent mononuclear aromatic radical or a divalent radical comprising two or more mononuclear rings connected by carbon-carbon single bond or by divalent connective groups and $n$ is an integer greater than 10 are produced by a variety of polycondensation reactions.

---

One object of the present invention is to provide certain novel polymeric products having high heat stability. It is another object of this invention to prepare novel elastomeric products.

An additional object of the present invention is to provide new and improved polymerization processes which result in the formation of soluble, tractable poly aromatically-substituted poly(vinylene) polymers.

A still further object of the present invention is to provide new and improved polymerization processes which can utilize related aromatic compounds containing at least two substituents selected from the group consisting of arylmethyl, aryldichloromethyl, arylcarbonyl, heteroarylmethyl, heteroaryldichloromethyl, and heteroarylcarbonyl radicals.

These and other objects of the present invention will become readily apparent from the ensuing description and illustrative embodiments.

The novel compositions of this invention are soluble, tractale polymers represented by the formula

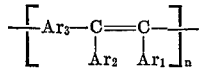

in which $Ar_1$ and $Ar_2$ are each monovalent carbocyclic or heterocyclic aromatic radicals which may contain nuclear substituents, such as for example, the phenyl radical, the 2-pyridyl radical, the 4-pyridyl radical, the 2-s-triazinyl radical, the 4-chlorophenyl radical, and the 4-nitrophenyl radical; $Ar_3$ is a divalent mononuclear carbocyclic or heterocyclic aromatic radical or a divalent radical comprising two or more mononuclear carbocyclic or heterocyclic rings connected by carbon-carbon single bonds or by divalent connective groups, such as the oxy group, the thio group, and the sulfonyl group; and $n$ is a positive integer greater than 10.

When the divalent aromatic radical $Ar_3$ comprises a mononuclear carbocyclic or heterocyclic ring, the two valences of the said divalent radical stem from nuclear carbon atoms which stand in the meta-, or 1,3- relationship to each other, that is, from nuclear carbon atoms which are separated from each other by one nuclear atom when counting around the said mononuclear carbocyclic or heterocyclic aromatic ring by the shorter path from a nuclear carbon atom bearing one of the valences of the said divalent aromatic radical to the nuclear carbon atom bearing the other valence of the said divalent aromatic radical, as for example, in the 1,3-phenylene diradical; the 2,5-thiophenediyl diradical; the 2,5-imidazolediyl diradical; the 2,4-pyridinediyl diradical; the 3,5-pyridinediyl diradical; the 2,4- 2,6-, and 4,6-pyridinediyl diradicals; and the s-triazine-2,4-diyl diradical.

When the divalent aromatic radical $Ar_3$ contains more than one carbocyclic or heterocyclic aromatic ring connected by carbon-carbon single bonds or by connective groups such as the oxy group, the thio group, or the sulfonyl group, the two valences of the said divalent radical $Ar_3$ stem from the two terminal rings of the divalent radical, from carbon atoms in each of the said terminal rings which stand in the meta-, or 1,3- relationship to the remainder of the said divalent radical, as for example, in the 3,3'-biphenylylene diradical, the p-terphenyl-3-3'-xylene diradical, the 3,3'-oxydiphenylene diradical, the 3,3'-thiodiphenylene diradical, and the 3,3'-sulfonyldiphenylene diradical.

The importance of specifying that the two valences of the divalent aromatic radical $Ar_3$ in Formula I be oriented in the meta-sense for the production of soluble, tractable elastomeric polymers is indicated by the fact that, although poly [1,3-phenylene-(diphenylvinylene)], a polymer corresponding to Formula I where $Ar_1$ and $Ar_2$ are each phenyl and $Ar_3$ is 1,3-phenylene, is a soluble, tractable polymer becoming rubbery at over about 250° C. irrespective of the method of its preparation, the related polymers poly [1,4-phenylene(diphenylvinylene)] and poly [4,4'-(oxydiphenylene)(diphenylvinylene)], which were disclosed in U.S. patent application Ser. No. 356,928 and which conform to Formula I in all respects except that the specified meta-orientation is replaced by para- or 1,4-orientation, are insoluble, intractable solids.

The soluble, tractable elastomeric polymers of this invention may be prepared by a variety of methods. In the preferred method of preparation, a compound represented by Formula II is heated with an equimolar amount of a compound corresponding to Formula III

wherein $Ar_1$, $Ar_2$, and $Ar_3$ have the same significance as in Formula I.

Examples of compounds of the type (II) are: 1,3-dibenzylbenzene; 1,3 - bis(2-pyridylmethyl)benzene; 1,3-bis(4 - pyridylmethyl)benzene; 1,3-bis(2 - s - triazinylmethyl)benzene; 1,3 - bis(4 - chlorobenzyl)benzene; 1,3 - bis(4 - nitrobenzyl)benzene; 3,3' - dibenzylbiphenyl; 3,3" - dibenzyl - m - terphenyl; 3,3" - dibenzyl - p - terphenyl; 3,3" - bis(4 - pyridylmethyl) - m - terphenyl; 2,5-dibenzylthiophene; 3,5 - bis(4 - pyridylmethyl)pyridine; 2,4 - bis(2 - s - triazinylmethyl) - s - triazine; 3,3' - dibenzyldiphenyl sulfide; 3,3'-dibenzyldiphenyl sulfone.

Illustrative of the compounds represented by the Formula III are: 1,3-bis($\alpha,\alpha$-dichlorobenzyl)benzene; 1,3-bis(s - pyridyldichloromethyl)benzene; 1,3 - bis(2 - s-triazinyldichloromethyl)benzene; 1,3 - bis($\alpha,\alpha$ - p - trichlorobenzyl)benzene; 3,3" - bis($\alpha,\alpha$ - dichlorobenzyl)-m - terphenyl; 3,3' - ($\alpha,\alpha'$-dichlorobenzyl)diphenyl ether.

The polycondensation is carried out at temperatures ranging from about 200° to 500° C., with temperatures of 250° to 350° C. being preferred. The heating is continued until the elimination of hydrogen chloride is complete. Temperatures in the lower part of the specified range are preferred during the early stages of the reaction, and as the polycondensation proceeds the temperature is gradually increased. During the later stages of the polycondensation it is preferable to operate at reduced pressures to hasten the elimination of the final traces of hydrogen chloride. Because the reaction mass becomes increasingly viscous as the polycondensation proceeds, it is preferred to employ agitation. Although ordinary stirrers can be used to advantage, the use of high-shear mixing, such as is realized in Banbury mixers or even specially designed extruders, may be necessary to achieve the highest molecular weight polymer.

In some cases it is advantageous to conduct the polycondensation in a high-boiling solvent, such as for example, chlorinated biphenyl fractions. The solvent may be added at the start, but it is often preferable to add it in the later stages of the polycondensation to effect a softening or plasticization of the reacting polymeric mass. The amount of solvent used may range from about 0.1 to 20 parts based on 1 part of the total amount of or even specially designed extruders, may be necessary to 10 parts are preferred.

In other cases it may be advantageous to use a high-boiling solvent of basic character either as a reaction solvent or as a catalytically-active component to be added to the reactants when they are condensed in the bulk liquid phase or in solution in a relatively inert reaction solvent, such as the chlorinated biphenyl fractions mentioned above. Examples of such basic solvents are pyridine, quinoline, isoquinoline, carbazole, acridine, and the like, and mixtures thereof. The use of basic substances of this nature, either as solvent or catalyst, may serve to reduce the temperature at which the polycondensation takes place as well as to accelerate its rate, and may lead to polymers of higher molecular weight. At lower temperatures of polycondensation when the basic substances mentioned above are used as solvent, they serve to bind the hydrogen chloride produced as a result of the polycondensation and thus to promote the reaction. At high temperatures, however, the hydrogen chloride is no longer so strongly held and it escapes from the system, although the over-all beneficial effect of the basic solvent is still realized. When the basic substances mentioned are used as a solvent, they are employed in amounts which range from about 1 to 20 parts based on 1 part of the total weight of the polymer to be produced, but amounts ranging from about 1 to 10 parts are preferred. If the basic substance is used as a catalyst, it is employed in an amount ranging from about 0.0001 to 0.1 part based on the total weight of the polymer to be produced, with 0.0001 to 0.01 part being preferred.

The time required to complete the polycondensation may vary widely, for example from about 0.1 hour to as much as 100 hours. Usually 3 to 30 hours are sufficient.

The pressure is generally autogenous, being governed by the temperature and the nature of the reactants and solvents used. In most cases it is desirable to permit hydrogen chloride to escape from the system and even to conduct the final stages of the polycondensation under reduced pressures, with provision being made to condense and return to the reaction any solvent which vaporizes.

The polycondensation is preferably carried out under anhydrous conditions and under inert gases such as nitrogen, helium, carbon dioxide, methane, argon, and the like, and mixtures thereof.

The polymers obtained by bulk polycondensation may often be used directly. If the polycondensation is conducted in solution, the polymer is recovered by precipitation with a non-solvent followed by collection by filtration, washing, and drying.

Although the novel compositions of this invention are prepared in the preferred embodiment by the polycondensation of compounds represented by the Formulas II and III, it is also possible to combine the reactive functionalities in Formulas II and III into a single molecule, as in Formula IV $$Ar_1-CH_2-Ar_3-CCl_2-Ar_2 \qquad (IV)$$

wherein $Ar_1$, $Ar_2$, and $Ar_3$ have the same significance as in Formula I. An important advantage to be realized in preparing polymers of the structure (I) by the polycondensation of a single substance of the structure (IV), rather than by the polycondensation of mixtures of substances of the structure (II) and (III), resides in the elimination of the requirement for careful balancing of the amounts of (II) and (III) taken for the reaction.

The novel compositions of this invention may also be prepared by permitting compounds of the structure (III) to interact in a stoichiometric coupling reaction with certain lower valence transition metal salts, for example, chromous chloride, in anhydrous dipolar aprotic solvents, such as for example, N,N-dimethylacetamide. This process is set forth in detail in U.S. patent application Ser. No. 356,928.

For example, 1,3 - bis($\alpha,\alpha$-dichlorobenzyl)benzene is dissolved in a suitable dipolar aprotic solvent and added over a period ranging from a few seconds up to 1 hour at a temperature ranging from room temperature up to about 200° C. to a stirred solution of an anhydrous lower-valent transition metal salt in an anhydrous dipolar aprotic solvent such as N,N-dimethylacetamide, also at a temperature of from room temperature up to about 200° C. and under a substantially oxygen-free inert atmosphere such as $N_2$. The reaction is continued for a period of about 1 hour to about 24 hours with stirring at a temperature ranging from room temperature up to about 200° C. After the reaction is completed, the reaction mixture may be diluted with more dipolar aprotic solvent or with water to promote filtration, and the polymer present, i.e., poly[1,3-phenylene(diphenylvinylene)], is removed by filtration; washed free of metal salts with more dipolar aprotic solvent or with water; extracted and a solvent for unreacted halogen-containing aromatic compound, by-products, and low-polymers; and finally dried.

Still another method for the preparation of certain of the novel compositions of this invention comprises the polycondensation of compounds of the structure (II) with diketones of the structure (V)

$$Ar_1-CO-Ar_3-CO-Ar_2 \qquad (V)$$

wherein the radicals $Ar_1$, $Ar_2$, ind $Ar_3$ have the same significance as in Formula I and wherein the polycondensation is accomplished by heating mixtures of (II) and (V) at gradually increasing temperatures, with the elimination of water and in the presence of basic catalysts such as alkaline and alkaline earth metal oxides, hydroxides, alkoxides, amides, as well as nitrogen-bases such as piperidine, pyridine, quinoline, and the like.

A further method for preparing the novel compositions of this invention comprises the heating of compounds of the structure (II) with elemental sulfur until the elimination of hydrogen sulfide is complete.

The novel compositions of this invention are soluble, tractable, elastomeric materials which exhibit high resistance to heat. For example, the thermogravimetric analysis under nitrogen of poly[1,3-phenylene (diphenylvinylene)] shows no appreciable weight loss up to 500° C., and at 900° C. residues of 61–82% remain. It has been observed that in air at 380° to 388° C. poly[1,3-phenylene (diphenylene)] suffers perceptible loss in its rubbery properties only after 4 to 5 hours of heating.

The novel compositions of this invention may be compounded with carbon or other fillers. Vulcanization or cross-linking can be achieved by heat alone, and compounded materials of improved heat resistance can be prepared. For example, the composition can be cross-linked by heating it for about 0.25 to 5 hours, preferably about 1 to 3 hours, at about 200° to 400° C., preferably 250° to 350° C.

Various plasticizers may be incorporated into the novel composition of this invention with the results that the range of temperature over which the compositions are rubbery is greatly extended in the direction of lower temperatures. For example, specimens of poly[1,3-phenylene (diphenylvinylene)] plasticized with chlorinated diphenyl and triphenyl fractions are rubbery down to room temperature.

The compositions of this invention, because of the combination of solubility, tractability, rubbery character, and high heat stability, are useful in applications where extreme resistance to heat is required; they may be compounded and fabricated into such articles as hose, tubing, gaskets, "O" rings, and sheets, and may also be used in the form of films, coatings, and moldings.

The invention will be more fully understood by reference to the following illustrative embodiments:

EXAMPLE I

Preparation of poly[1,3-phenylene (diphenylvinylene)] by the polycondensation of 1,3-dibenzylbenzene and 1,3-bis($\alpha,\alpha$-dichlorobenzyl)benzene (A) Preparation of 1,3-dibenzoylbenzene.—1,3-dibenzoylbenzene was prepared according to the method of Ador [Ber., 13, 320 (1880)] by allowing isophthaloyl dichloride to react with benzene in the presence of anhydrous aluminum chloride. It was also prepared by an independent method in which isophthaldehyde was allowed to react with excess phenylmagnesium bromide to yield 1,3-bis($\alpha$-hydroxybenzyl)benzene, which was subsequently oxidized to 1,3-dibenzoylbenzene by the action of chromic anhydride in acetic acid. 1,3-dibenzoylbenzene, when highly purified by repeated crystallization and vacuum sublimination, melts in the range of 106.3–107.5° C. (corr.), irrespective of the method of preparation, and a mixed melting point determination as well as the comparison of the infrared absorption spectra show that the products of both methods of preparation are identical. Somewhat lower melting points have been reported for 1,3-dibenzoylbenzene in the literature, e.g., 99.5–100° C. (Ador); 101–102° C. [Zonev, J. Russ, Phys, Chem. Soc., 48, 566 (1916)].

1,3-dibenzoylbenzene from isophthaloyl dichloride and benzene

In a three-liter, three-necked flask equipped with mechanical stirrer, thermometer, nitrogen-inlet, dry-solids addition inlet, and reflux condenser was placed 700 ml. of dry benzene and 50.8 grams (0.25 mole) of isophthaloyl dichloride (Aldrich Chemical Co., M.P., 43–45° C.). The mixture was cooled to 10° C. and 85 grams (0.64 mole) of anhydrous aluminum chloride was added with stirring over 45 minutes to produce a yellow solution which began to evolve gaseous HCl. The solution was allowed to warm to 30° C. to hasten HCl evolution. It was then heated at reflux for 5 hours, cooled under $N_2$, and finally poured into ice-HCl mixture. The benzene layer was separated; washed with hot water, 10% HCl solution, water, and 5% sodium bicarbonate solution water; and dried over anhydrous magnesium sulfate. The solvent was removed to yield a white solid, 67.3 grams (93 percent yield), M.P. 97–103° C. Seven recrystallizations from benzene followed by vacuum sublimation yielded an analytical sample, M.P. 106.7–107.5° C. (corr.).

Analysis.—Calculated for $C_{20}H_{14}O_2$: C, 83.90%; H, 4.93%. Found: C, 83.69%; H, 4.78%.

Molecular weight.—Calculated: 286. Found: 288, in acetone, using a Mechrolab vapor pressure osmometer calibrated with bibenzyl.

1,3-dibenzoylbenzene by independent synthesis

Isophthaldehyde, M.P. 89–90° C., 6.7 grams (0.05 mole), obtained from $\alpha,\alpha,\alpha',\alpha'$-tetrabromo-m-xylene by the method of Thiele and Gunther [Ann., 347, 109 (1906)], was reacted with excess phenylmagnesium bromide at ice-bath temperature by the method of Deluchat [Comp. rend., 190, 138 (1930)] to afford, after purification by recrystalization from benzene and vacuum sublimation, 2.69 grams (18.5 percent) of 1,3-bis alpha-hydroxy benzyl benzene, M.P. 158–9° C., reported M.P. 157° C. (Deluchat).

Analysis. — Calculated for $C_{20}H_{18}O_2$: C, 82.73%; H, 6.25%. Found: C, 83.02%; H, 6.40%.

To a solution of 0.67 gram (0.0023 mole) of the sublimed, 1,3 - bis($\alpha$-hydroxybenzyl)benzene in 20 ml. of glacial acetic acid at 50° C. was added over 15 minutes a solution of 0.50 gram (0.0050 mole) of chromic anhydride in a solution of 15 ml. of glacial acetic acid and 3 ml. of water. After 45 minutes at 50–70° C. the brown solution was poured into 250 ml. of water. The solid separating was collected, washed with water, and dried in vacuum at 50° C., 0.64 gram (97%), M.P. 105.5–106.5° C. (corr.). Two recrystallizations from ethanol, followed by vacuum sublimation, yielded an analytical sample, M.P. 106.3–106.8° C. (corr.).

Analysis. — Calculated for $C_{20}H_{14}O_2$: C, 83.90%; H, 4.93%. Found: C, 84.42%; H, 5.15%.

A mixed melting point determination with the above crude 1,3 - dibenzoylbenzene and highly-purified 1,3-dibenzoylbenzene prepared by the method of Ador, above, M.P. 106.7–107.5° C. (corr.) showed no depression, M.P. 106.7–107° C. (corr.). The infrared absorption spectra of the two independent preparations were practically identical.

(B) Preparation of 1,3 - bis($\alpha,\alpha$-dichlorobenzyl)benzene.—In a 500 ml., three-necked flask equipped with a mechanical stirrer, reflux condenser, and nitrogen-inlet was placed 28.1 grams (0.10 mole) of 1,3-dibenzoylbenzene and 41.6 grams (0.20 mole) of phosphorous pentachloride. The mixture was heated slowly to reflux (125° C.) and held at reflux for 1.5 hours. The liquid mixture was distilled until 16 ml. of liquid was recovered (18.5 ml. theory, phosphorus oxytrichloride). The residue, 39.5 grams, was vacuum distilled to yield the following fractions:

| Fraction | B.P., °C. | Mm. Hg | Wgt., grams | $n_D^{25}$ | Percent Yield |
|---|---|---|---|---|---|
| 1 | 216–222 | 0.9 | 2.546 | 1.6241 | |
| 2 | 222–224 | 0.9 | 5.417 | 1.6250 | |
| 3 | 224–222 | 0.9–0.75 | 23.197 | 1.6267 | 58.8 |
| 4 | 224 | 0.9 | 1.647 | 1.6269 | |

Residue: black, brittle solid, 3.602 grams.

Fraction 3 was redistilled twice to afford an analytical sample, B.P. 211° C. (0.6 mm.), $n_D^{25}$ 1.6266.

Analysis.—Calcd. for $C_{20}H_{14}Cl_4$: C, 60.91%; H, 3.55%; Cl, 35.53%. Found: C, 60.82%; H, 3.31%; Cl. 35.22%.

The method of synthesis and the analyses indicate that fraction 3 is 1,3 - bis($\alpha,\alpha$-dichlorobenzyl)benzene. The structure of the compound was proven by heating 0.762 gram with 50% aqueous ethanol to boiling and recovering 1,3 - dibenzoylbenzene, 0.541 gram (98.3 percent yield), M.P. 105.5–106.5° C. No depression was observed in a mixed melting point determination with authentic 1,3-dibenzoylbenzene, M.P. 106.5° C.

(C) Synthesis of 1,3 - dibenzylbenzene.—1,3-dibenzylbenzene was prepared by hydrogenation of 1,3-dibenzoylbenzene over a copper chromite catalyst, as suggested by the work of Cantor [J. Chem. Eng. Data, 8, 459 (1963)]. For example, in a 300-ml. stirred autoclave was placed 56.2 grams (0.175 mole) of 1,3-dibenzoylbenzene, 170 ml. of absolute ethanol, and 5.0 grams of a copper chromite catalyst (Harshaw Chemical Co., 54% CuO, 41% $Cr_2O_3$). The mixture was stirred under 1225–1755 p.s.i.g. of hydrogen for 16 hours at 180–200° C. After removal of the catalyst and solvent, a total of 45.0 grams of light brown oil remained. On fractional distillation in vacuum, a total of 12.1 grams (27 percent) of clear, faintly-yellow liquid was obtained, B.P. 150° C. (0.1 mm.), $n_D^{20}$ 1.6038 [literature: B.P. 175° C. (1 mm.), $n_D^{20}$ 1.6037 (Cantor)]. Redistillation afforded a clear, colorless liquid, B.P. 153–9° C. (0.25 mm.), $n_D^{19}$ 1.6034.

(D) Polycondensation of 1,3-bis(α,α-dichlorobenzyl)-benzene with 1,3 - dibenzylbenzene at atmospheric pressure.—A dry, nitrogen-flushed glass test tube reactor was equipped with a mechanical stirrer, a gas-outlet, and a thermocouple well. Nitrogen was supplied to a glass T connected at one end to the gas-outlet of the reactor and at the other end to an oil-bubbler which served to show nitrogen flow and to provide an exit for the hydrogen chloride which was evolved during the reaction. To the reactor was charged 3.067 grams (7.75 mM.) of 1,3-bis-(α,α-dichlorobenzyl)benzene and 2.030 grams (7.87 mM.) of 1,3-dibenzylbenzene. The colorless solution was heated with stirring for 24 hours at 290–300° C., during which time hydrogen chloride was evolved and the reactants were transformed into a very viscous dark brown mass which became a glass on cooling (100% yield, crude). The polymer was exhaustively extracted with acetone (Soxhlet). The weight loss was only 3.5 percent. In hot acetone the polymer was soft and somewhat elastic. The crude and extracted polymers both softened at 220–225° C. to a dark brown molten mass which became rubbery on longer heating. The polymer was completely soluble in Arochlor 1242 on heating and had an inherent viscosity of 0.074 (0.40 g./100 ml. 305° C.)

*Analysis.*—Calculated for $(C_{20}H_{14})_n$: C, 94.45%; H, 5.55%. Found: C, 92.76%; H, 5.44%; Cl, 0.57%.

The infrared spectrum of the extracted polymer is essentially identical to the spectrum for poly[1,3-phenylene-(diphenylvinylene)], also known as poly(α,α'-diphenyl-1,3 - xylenediylidene) and poly(2,2'-diphenyl-1,3-xylylidene), prepared by the chromous chloride coupling method as described in Example IV.

EXAMPLE II

Polycondensation of 1,3-bis(α,α-dichlorobenzyl)-benzene with 1,3-dibenzylbenzene at atmospheric pressure and finally under vacuum Following the procedure of Example I, Part D, a mixture of 1.898 grams (7.333 mM.) of 1,3-dibenzylbenzene and 2.902 grams (7.333 mM.) of 1,3-bis(α,α-dichlorobenzyl)benzene was heated in a dry glass test tube reactor under argon at atmospheric pressure at 270–295° C. for 6 hours, during which time hydrogen chloride evolved, the solution changed from colorless to yellow to brown and finally black, and gradually became viscous. It was then heated under vacuum (0.075 mm.) at 270–295° C. for 16 hours. The black, foamed solid obtained on cooling weighed 3.681 grams (98.9 percent) and softened at 254° C. to a rubbery mass. Soxhlet extraction of the crude polymer with acetone reduced the yield to 95.7 percent. The extracted black polymer softened at 240–245° C., with similar rubbery behavior. The polymer, poly[1,3 - phenylene(diphenylvinylene)], was completely soluble in Arochlor 1242 on heating and exhibited an inherent viscosity 0.13 dl./g., (0.40 g./100 ml. 305° C.).

*Analysis.*—Calculated for $(C_{20}H_{14})_n$: C, 94.45%; H, 5.55%. Found: C, 92.91%; H, 5.50%; Cl, 0.56%; ash, none.

No weight loss was observed up to 500° C. and only a 19 percent weight loss was experienced up to 900° C. on thermogravimetric analysis under nitrogen.

EXAMPLE III

Preparation of poly[1,3-phenylene(diphenylvinylene)] by coupling 1,3 - bis (α,α - dichlorobenzyl)benzene with chromous chloride (A) Preparation of solutions of anhydrous chromous chloride in dipolar aprotic solvents.—Solutions of chromous chloride were prepared in a variety of anhydrous dipolar aprotic solvents, such as N,N-dimethylacetamide, N,N-dimethylformamide, N-methyl-2-pyrrolidone, tetramethylurea, hexamethylphosphoric triamide, and dimethyl sulfoxide by warming a slurry of anhydrous chromic chloride and zinc in the solvent. Concentrations of 1–1.5 M chromous chloride were easily obtained.

In a 2-liter, 3-necked flask was placed 170.4 grams of commercial anhydrous chromic chloride. After heating overnight in air at 210–220° C., the flask was cooled under a nitrogen purge. 168.6 grams (1.06 moles) of dry chromic chloride remained. To the flask, equipped with a strong magnetic stirrer, thermometer, nitrogen inlet, reflux condenser, and solids-addition flask connected by Gooch tubing, was added 1 liter of N,N-dimethylacetamide, redistilled from phosphorus pentoxide under nitrogen, and gradually, with warming and stirring under nitrogen, 65.2 grams (1 g.-atom) of dry, 20 mesh metallic zinc. The reduction started at about 55° C., as evidenced by the appearance of a dark purple color, and the temperature rose spontaneously to 91° C. After the initial reaction subsided, the reaction was continued for a total of 3 hours at 53–55° C. to give a dark blue solution. The solution was 1.03 M in chromous chloride, as determined by withdrawing a 1-ml. aliquot, injecting it into 25 ml. of 0.25 M ferric chloride under nitrogen, and titrating the ferrous chloride formed with standard ceric ammonium sulfate solution to the bright green endpoint using "Ferroin" indicator (o-phenanthroline ferrous sulfate complex). The solution was transferred to a dry, $N_2$-flushed storage flask through a filter stick by means of a slight positive nitrogen pressure applied cautiously to the reactor flask. Such solutions must be kept isolated from oxygen and moisture and can conveniently be handled with dry hypodermic syringes.

(B) Coupling of 1,3 - bis(α,α-dichlorobenzyl)benzene with chromous chloride in anhydrous N,N-dimethylacetamide at 70° C.—A 200 ml., three-necked, creased round bottom flask, provided with a thermocouple well, was fitted with a mechanical stirrer, a pressure-equalizing addition funnel (50 ml.) wrapped with heating-tape and equipped with a thermometer, a nitrogen-inlet, a small reflux condenser, and a heating mantle. Before starting, the glassware was heated overnight in an oven at 200° C., assembled rapidly, and allowed to cool under a nitrogen purge.

To the flask was added 30 ml. of an N,N-dimethylacetamide solution containing 27 mM. chromous chloride. The solution was heated to 70° C. under nitrogen, and to it was added from the heated addition funnel a solution of 1.314 grams (3.33 mM.) of 1,3-bis(α,α-dichlorobenzyl)benzene in 20 ml. of anhydrous N,N-dimethylacetamide at 70° C., as rapidly as possible, followed by 5 ml. N,N-dimethylacetamide rinse. An exotherm to 82° C. was observed. After 1 hour of reaction at 70–71° C., titration indicated that 12.6 mM. chromous chloride had been consumed, corresponding to a consumption of 0.95 mole of chromous chloride per equivalent of chlorine in the 1,3 - bis(α,α - dichlorobenzyl)benzene. The reaction mixture was diluted with 500 ml. of water, and the yellow-orange solid present was collected, washed with water, and dried; 0.812 gram (96 percent). Exhaustive acetone-extraction reduced the yield to 0.788 gram (92.8 percent). The extracted yellow-orange polymer softened at about 320° C. when placed in a temperature gradient bar (Sorenson and Campbell, "Preparative Methods in Polymer Chemistry," Interscience Publishers, Inc., New York, 1961, pp. 49–50) to form a dark, rubbery mass. A 30-mg. specimen of the polymer heated under nitrogen in 5 ml. of Arochlor 1242 (a chlorinated biphenyl fraction, Monsanto Chemical Co.) at 305° C. was almost entirely soluble.

*Analysis.*—Calculated for $(C_{20}H_{14})_n$: C, 94.45%; H, 5.55%. Found: C, 93.41%; H, 5.35%; Cl, 0.13%; Ash 0.89%.

Specimens of poly[1,3 - phenylene(diphenylvinylene)] were placed on the temperature gradient bar and heated in air to test its general heat stability, as judged by the length of time the polymer would retain its rubbery character. At 280–285° C. the specimen was only slightly less rubbery after 24 hours. At 380–388° C. the specimen appeared distinctly less rubbery only after 4 to 5 hours.

EXAMPLE IV

Repeat coupling of 1,3-bis($\alpha,\alpha$-dichlorobenzyl)benzene to poly[1,3-phenylene(diphenylvinylene)] with chromous chloride in anhydrous N,N-dimethylacetamide at 70° C.

Following the procedure of Example III, Part B, in a 500-ml. glass reaction flask, to 72 ml. of a solution of 54 mM. of anhydrous chromous chloride in N,N-dimethylacetamide, prepared as described in Example III, Part A, heated to 70° C. was added rapidly a 70° C. solution of 2.62 grams (6.66 mM.) of 1,3-bis($\alpha,\alpha$-dichlorobenzyl)benzene in 13 ml. of anhydrous N,N-dimethylacetamide. After 95 minutes reaction at 68–72° C., titration showed that 1.08 mole of chromous chloride had been consumed per gram-equivalent of chlorine in the 1,3-bis($\alpha,\alpha$-dichlorobenzyl)benzene. Isolation of the solid reaction product as described in Example III, Part B, yielded 1.407 grams (82.3 percent) of yellow-orange acetone-extracted poly[1,3 - phenylene(diphenylvinylene)]. The extracted polymer softened with darkening to form a rubber at 300–8° C. In Arochlor 1242 at 305° C., in a special viscometer of the type described in the literature [Schaefgen, J. Polymer Sci., 41, 133 (1959)] the inherent viscosity of the extracted polymer was found to be 0.25 dl./g. (0.40 g./100 ml., at 305° C.).

Analysis.—Calculated for $(C_{20}H_{14})_n$: C, 94.45%; H, 5.55%. Found: C, 93.93%; H, 5.67%; Cl, 0.33%; Ash, 0.27%.

The infrared absorption spectrum was practically identical with that obtained with the polymer of Example I, Part D, which was prepared by polycondensation of 1,3-dibenzylbenzene with 1,3-bis($\alpha,\alpha$-dichlorobenzyl)benzene. The great similarity of the two spectra is strong evidence that the two polymers have essentially identical structures.

The presence of in-chain double bonds in the polymer of Example IV is supported by the finding that about 1.7 atoms of chlorine are added per repeat unit out of a theoretical 2 atoms and that this chlorine is removed on subsequent reaction of the chlorinated polymer with chromous chloride in N,N-dimethylacetamide, as more fully described hereinafter.

Chlorination

To a large test tube was charged 0.307 gram (1.21 mM.) of the poly [1,3-phenylene(diphenylvinylene)] of Example IV and 25 ml. of carbon tetrachloride. Chlorine gas was bubbled through the suspension at room temperature for 45 seconds, whereupon decolorization of the yellow-orange color of the polymer to form a white insoluble substance was observed. The suspension was filtered at once, washed 5 times with carbon tetrachloride to yield, after thorough drying, 0.380 gram of a yellow solid softening at 216–226° C.

Analysis.—Calculated for $(C_{20}H_{14}Cl_2)_n$: C, 73.86%; H, 4.34%; Cl, 21.8%. Found: C, 75.23%; H, 4.54%; Cl, 18.68%; Ash, 0.93%.

It was calculated from the analysis that about 1.7 atoms of chlorine had been taken up by the polymer per repeat unit.

Dechlorination

In a 100-ml. three-necked flask, flushed with nitrogen and fitted with a magnetic stirrer, reflux condenser, thermometer, and a nitrogen blanket was placed 205 mg. of the chlorinated polymer and 5 ml. of anhydrous N,N-dimethylacetamide. The suspension was heated to 155–160° C. and 5 ml. of 1.02 M chromous chloride (5.1 mM.) solution was added over 5 minutes. After heating at 165° C. (reflux) for 2.5 hours, titration indicated 2.5 mM. of chromous chloride had been consumed. The mixture was diluted with water, the solid collected, washed with water and dried, 164 mg. brown solid; 33 mg. were recovered from the titration: total, 197 mg. (118 percent). The 164-mg. product was analyzed after thorough drying.

Analysis.—Calculated for $(C_{20}H_{14})_n$: C, 94.45%; H, 5.55%. Found: C, 85.81%; H, 5.55%; Cl, 1.64%; Ash, 3.20%.

The analysis shows that nearly all of the added chlorine can be removed by chromous chloride, as would be expected if the chlorine had added to the in-chain double bonds rather than to the aromatic nuclei by substitution.

The infrared absorption spectrum of the dechlorinated polymer was similar to that of the original poly[1,3-phenylene(diphenylvinylene)] of Example IV, so that it is evident that the dechlorinated substance is essentially poly[1,3-phenylene(diphenylvinylene)].

EXAMPLE V

Coupling of 1,3-bis($\alpha,\alpha$-dichlorobenzyl)benzene to poly[1,3-phenylene(diphenylvinylene)] with chromous chloride in anhydrous N,N-dimethylacetamide at 165° C.

Following the procedure of Example III, Part B, but employing a 500-ml. reaction flask, to 230 ml. of an anhydrous N,N-dimethylacetamide solution of 254 mM. of chromous chloride at 165° C. was added over 5 minutes 13.37 grams (33.76 mM.) of 1,3-bis($\alpha,\alpha$-dichlorobenzyl)benzene in 165 ml. of anhydrous N,N-dimethylacetamide heated to 165° C. After 1 hour of reaction at 165° C., titration showed that 1.07 mole of chromous chloride had been consumed per gram-equivalent of chlorine in the 1,3-bis($\alpha,\alpha$-dichlorobenzyl)benzene. Isolation of the solid reaction product as described in Example III, Part B, yielded 7.29 grams (85.3 percent) of acetone-extracted yellow-orange poly[1,3 - phenylene(diphenylvinylene)]. The polymer softened with darkening to form a rubber when placed on a temperature gradient bar at 312–22° C. The polymer had an inherent viscosity of 0.10 (0.40 g./100 ml. Arochlor 1242, 305° C.).

Analysis.—Calculated for $(C_{20}H_{14})_n$: C, 94.45%; H, 5.55%. Found: C, 93.71%; H, 5.67%; Cl, 0.19%; Ash, 0.23%.

The infrared absorption spectrum of the polymer was essentially identical to the spectrum for the polymer of Example IV. The polymer exhibited no crystallinity to X-rays.

Oxidative degradation of poly[1,3-phenylene(diphenylvinylene)]

The oxidative degradation of poly[1,3 - phenylene(diphenylvinylene))] would be expected to yield, at least in part, 1,3-dibenzoylbenzene as a degradation product. This was found to be the case, as shown hereinafter.

To a solution of 2.00 grams (0.020 mole) of chromic anhydride in 20 ml. of glacial acetic acid was added 0.276 gram of the poly[1,3-phenylene(diphenylvinylene)] of Example V, with 3 ml. additional glacial acetic acid. The mixture was heated at 90–100° C. for 3 hours. The resulting brown solution was cooled and poured into 100 ml. of cold water. After standing overnight, the precipitate was collected, washed with water, and dried; 0.175 gram (56 percent), M.P. 95–97° C. (corr.), light green solid. Several recrystallizations, followed by vacuum sublimation, yielded white crystals, M.P. 106.3–106.9° C. (corr.). A mixture with authentic 1,3-dibenzoylbenzene, M.P. 106.5–106.8° C. (corr.) melted at 106.3–107.0° C. (corr.), demonstrating that the oxidative degradation product is as expected 1,3-dibenzoylbenzene.

Thermogravimetric analysis

The polymer was heated at the rate of 150° C. per hour. No weight loss was observed up to 475° C., and the weight loss at 900° C. was 38.5 percent.

EXAMPLE VI

Model reaction for the chromous coupling process of Examples III, IV, and V

To demonstrate further the correctness of the structure of poly[1,3-phenylene(diphenylvinylene)] as prepared by coupling 1,3 - bis($\alpha,\alpha$ - dichlorobenzyl)benzene with chromous chloride in N,N-dimethylacetamide, the model coupling of benzophenone dichloride in N,N-dimethylacetamide was carried out under conditions identical to those used in the preparation of the polymer. As expected, tetraphenylethylene was isolated in a practically quantitative yield, as more fully described hereinafter.

To 29 ml. of a 0.967 M solution of chromous chloride (28 mM.) in anhydrous N,N-dimethylacetamide at 70° C. under nitrogen was added rapidly 1.680 grams (7.12 mM.) of benzophenone dichloride [prepared by heating benzophenone with 1 mole of phosphorous pentachloride, B.P. 99° C. (0.2 mm.), $n_D^{23.4}$ 1.6033; literature: B.P. 193° C (30 mm.), Gatterman and Schulze, Ber., 29, 2944 (1896); $n_D^{22}$ 1.6015, Andrews and Kaeding, J. Am. Chem. Soc., 73, 1007 (1950); $n_D^{23}$ 1.6034, Bensley and Kohnstam J. Chem. Soc., 287 (1956)] in 20 ml. of anhydrous N,N-dimethylacetamide at 70° C., followed by 5-ml. rinse. After 1 hour at 70–5° C., titration showed 0.95 mole of chromous chloride had been consumed per gram-equivalent of chlorine in the benzophenone dichloride. The reaction mixture was cooled to 35° C. and poured into 500 ml. of water. After 1 hour the yellow precipitate was collected, washed with water, and dried; 1.158 grams (97.9 percent) M.P. 221–3° C. The crude reaction product in a mixed melting point determination with sublimed, authentic tetraphenylethylene, M.P. 223–4° C., melted at 223–4° C. The infrared absorption spectrum of the crude tetraphenylethylene was essentially identical with a reference spectrum for authentic tetraphenylethylene.

EXAMPLE VII

Coupling of 1,3-bis($\alpha,\alpha$-dichlorobenzyl)benzene to poly [1,3 - phenylene(diphenylvinylene)] with chromous chloride in anhydrous tetramethylurea Following the procedure of Example III, Part B, to 30 ml. of a 1.05 M solution of chromous chloride (31.5 mM.) in anhydrous tetramethylurea [the tetramethylurea was passed through a column of activated silica gel and molecular sieves, then distilled under nitrogen from phosphorus pentoxide, B.P. 177° C., (760 mm.)] at 70° C. was added rapidly 1.592 grams (4.03 mM.) of 1,3-bis($\alpha,\alpha$-dichlorobenzyl)benzene in 20 ml. of anhydrous tetramethylurea, followed by 5 ml. tetramethylurea rinse. After the reaction had proceeded for 2 hours at 69–72° C. with stirring, a titration showed that 0.92 mole of chromous chloride had been consumed per gram-equivalent of chlorine in the 1,3-bis($\alpha,\alpha$-dichlorobenzyl)benzene. Isolation of the solid reaction product as described in Example III, Part B, yielded 0.930 gram (91.0 percent) of acetone-extracted poly[1,3-phenylene(diphenylvinylene)] as an orange solid. The polymer softened with darkening to form a rubbery mass when placed on a temperature gradient bar at 248–250° C. It exhibited an inherent viscosity of 0.30 dl./g. (0.40 g./100 ml. Arochlor 1242, 305° C.).

EXAMPLE VIII

Coupling of 1,3-bis($\alpha,\alpha$-dichlorobenzyl)benzene to poly [1,3 - phenylene(diphenylvinylene)] with chromous chloride in anhydrous N,N-dimethylacetamide, the chromous chloride being generated by reducing chromic chloride with chromium metal Into the 200-ml. glass reactor unit described in Example III, Part B, was introduced under nitrogen 3.16 grams (20 mM.) of anhydrous chromic chloride, 0.52 gram (10 mg.-at.) of metallic chromium, and 30 ml. of anhydrous N,N-dimethylacetamide. The mixture was heated for 2 hours at 160° C., whereupon titration revealed that 25.4 mM. of chromous chloride had been formed. To this mixture was added 5.77 grams (110 mg.-at.) additional chromium, and the heating and stirring were continued for 1 hour more at 160° C., when the solution contained 33.4 mM. chromous chloride by titration.

To this slurry at 70° C. was added 1.63 grams (4.13 mM.) of 1,3-bis($\alpha,\alpha$-dichlorobenzyl)benzene in 20 ml. of anhydrous N,N-dimethylacetamide at 70° C., followed by 5 ml. of dimethylacetamide rinse. A 13° C. exotherm was observed. The reaction was continued at 70° C. for 1.25 hours, when titration showed that 0.93 mole of chromous chloride had been consumed per gram-equivalent of chlorine in the 1,3-bis($\alpha,\alpha$-dichlorobenzyl)benzene. The liquid layer in the flask was decanted into 500 ml. of water, and the solid thus obtained was washed with water and dried (solid 1). The metal-containing residue in the reactor was poured into 6 N HCl at 40° C. to dissolve the metal, and the organic solid remaining (solid 2) was washed with water and dried. Both solid 1 and solid 2 were then exhaustively extracted with acetone to yield: 0.75 gram of extracted solid 1, greenish-yellow, softening to a rubbery mass at 256–266° C. and 0.54 gram of extracted solid 2, bright yellow, becoming rubbery at 285–288° C. Heating samples of each extracted solid polymer in Arochlor 1242 at 305° C. followed by filtration showed that solid 1 was 77 percent and solid 2, 88 percent soluble.

From the solution of extracted solid 1 precipitation with n-hexane yielded a buff solid, softening at 255–260° C., in 83 percent recovery, which had an infrared absorption spectrum essentially identical to those for the extracted solids 1 and 2 and to that for the polymer of Example IV, showing that all of these materials are essentially poly[1,3-phenylene(diphenylvinylene)].

Extracted solid 1 (soluble portion) had an inherent viscosity of 0.086 in Arochlor 1242 (0.40 g./100 ml. 305° C.).

EXAMPLE IX

Synthesis of poly[1,3-phenylene(diphenylvinylene)] by the reaction of 1,3-dibenzylbenzene with sulfur Into a glass test tube reactor of the type employed in Example I, Part D, there is charged 2.58 grams (10 mM.) of 1,3-dibenzylbenzene and 0.64 gram (0.20 mM.) of elemental sulfur. The mixture is heated to 250° C. where darkening and evolution of hydrogen sulfide is observed. After stirring and heating for 12 hours at 250–290° C., the dark viscous product was cooled. The product is a poly [1,3-phenylene(diphenylvinylene)] having properties similar to those of the polymeric product of Example I, Part D.

EXAMPLE X

Polycodensation of 1,3-dibenzoylbenzene and 1,3-dibenzylbenzene in the presence of the sodium derivative of a higher alcohol In a dry, nitrogen-filled heavy-walled glass ampule of about 15-ml. capacity is placed 2.86 grams (10 mM.) of 1,3-dibenzoylbenzene, 2.58 grams (10 mM.) of 1,3-dibenzylbenzene, and 0.050 gram of the sodium derivative of 1-octadecanol prepared by heating 2.7 grams of 1-octadecanol and 0.23 gram of freshly-cut sodium under nitrogen until the sodium has dissolved and then allowing the solution to solidify. The ampule is frozen with a Dry Ice-acetone mixture, evacuated, and sealed. It is then heated in an oil bath to 300° C. for over 1 hour and then held at 290–310° C. for 6 hours, cooled, cautiously opened under a nitrogen atmosphere, again heated under 1 atmosphere of nitrogen at 250–300° C. for 5 hours, and finally heated at 270–300° C. for 2 hours under high vacuum. On cooling, a brown poly[1,3-phenylene(diphenylvinylene)] is recovered in high yield which is similar in its properties to the polymer of Example I, Part D.

EXAMPLE XI

Polycondensation of 2,4-dibenzoylpyridine and 2,4-dibenzylpyridine in the presence of the sodium derivative of a higher alcohol Following the procedure of Example X there is placed in a dry, heavy-walled glass ampule 2.87 grams (10 mM.) of 2,4-dibenzoylpyridine (Aldrich Chemical Co., Milwaukee, Wis.) and 2.59 grams (10 mM.) of 2,4-dibenzylpyridine (Aldrich Chemical Co., Milwaukee, Wis.) together with 0.062 gram of the sodium derivative of 1- octadecanol prepared as in Example X. The tube is sealed under vacuum and heated at 285–315° C. for 7.5 hours, cooled, opened under nitrogen, and heated under 1 atmosphere of nitrogen at 290–315° C. for 4.5 hours. Finally the tube is heated under high vacuum for 3 hours at 290–300° C. On cooling, a high yield of poly[2,4-pyridylene(diphenylvinylene)] is obtained. The polymer is comparable in its properties to the poly[1,3-phenylene(diphenylvinylene)] of Example I, Part D.

EXAMPLE XII

Polycondensation of 1,3-bis($\alpha,\alpha$-dichlorobenzyl)benzene with 1,3-dibenzylbenzene in Arochlor 1242

A dry 50-ml. two-necked flask equipped with a mechanical stirrer, thermocouple, gas-inlet, and gas-outlet is swept with nitrogen; to the flask is charged 3.96 grams (10 mM.) of 1,3 - bis($\alpha,\alpha$ - dichlorobenzyl)benzene, 2.58 grams (10 mM.) of 1,3-dibenzylbenzene, and 20 ml. of Arochlor 1242 [Monsanto Chemical Co., a chlorinated biphenyl fraction, redistilled under nitrogen, B.P. 124–133° C. (0.2 mm.)]. The solution is heated under a very slow nitrogen sweep at 250–280° C. for six hours. Hydrogen chloride is evolved, and the solution becomes dark brown. The temperature is increased to 300–315° C., and the heating and stirring are continued for about 12 hours. The flask is then connected to vacuum and heated at 280–315° C. until most of the solvent is removed. The viscous mixture is cooled; triturated repeatedly with hexane, then acetone; and dried. The product is a poly[1,3-phenylene (diphenylvinylene)] having properties similar to the product of Example I, Part D.

EXAMPLE XIII

Polycondensation of 1,3-bis($\alpha,\alpha$-dichlorobenzyl)benzene with 1,3-dibenzylbenzene in quinoline Following the procedure of Example XII a solution of 3.96 grams (10.0 mM.) of 1,3-bis($\alpha,\alpha$-dichlorobenzyl)benzene, 2.58 grams (10.0 mM.) of 1,3-dibenzylbenzene, and 20 ml. of dry, redistilled quinoline are heated slowly to reflux (238° C.) under nitrogen. The heating and refluxing with stirring are continued for a total of 6 hours, when vacuum is applied and most of the solvent is stripped off, the temperature being increased to 290–310° C. and held there for 4 hours during the final stages of the reaction. The viscous polymeric product is cooled to room temperature; triturated with aqueous-methanolic HCl solution, then acetone; and finally dried. Poly[1,3-phenylene(diphenylvinylene)] is obtained in high yield and conforms in properties to the product of Example I, Part D.

EXAMPLE XIV

Polycondensation of 3 - ($\alpha,\alpha$ - dichlorobenzyl)diphenylmethane synthesis of 3-($\alpha,\alpha$-dichlorobenzyl)diphenylmethane m-Toluic acid is converted to the acid chloride by heating with thionyl chloride. The excess of the latter is removed by distillation, and the residue is allowed to react with elemental chlorine at 75–80° C. to produce 3-chloromethylbenzoyl chloride. The 3 - chloromethylbenzoyl chloride is then permitted to react with benzene in the presence of boron trifluoride to produce substantial yields of 3-benzoyldiphenylmethane. When one mole of phosphorus pentachloride in carbon disulfide is added gradually to one mole of 3-benzoyldiphenylmethane in refluxing carbon disulfide, 3 - ($\alpha,\alpha$ - dichlorobenzyl)diphenylmethane is produced.

Polycondensation

In the apparatus and by the procedure described in Example I, Part D, 3.27 grams (10 mM.) of 3-($\alpha,\alpha$-dichlorobenzyl)diphenylmethane is heated with stirring at 280–310° C. for 10 hours and then heated under vacuum at 300–320° C. for 6 hours. On cooling, a dark brown solid poly[1,3 - phenylene(diphenylvinylene)] is obtained which exhibits properties similar to those of the polymer of Example I, Part D.

EXAMPLE XV

Preparation of poly[3,5-pyridinediyl(di-4-pyridylvinylene)]

In the apparatus and by the procedure described in Example I, Part D, a mixture of 0.64 gram (20 mM.) of elemental sulfur and 2.61 grams (10 mM.) of 3,5 - bis(4-pyridylmethyl)pyridine [prepared my the method of Poirer, Morin, McKim, and Bearse, J. Org. Chem., 26, 4275 (1961)] is heated for 15 hours at 250–300° C. On cooling, a dark brown polymer is obtained which is substantially poly[3,5 - pyridinediyl(di - 4 - pyridylvinylene)]. The polymer is soluble in concentrated sulfuric acid.

EXAMPLE XVI

Preparation of poly[2,5-thiophenediyl(diphenylvinylene)]

In the apparatus and by the procedure described in Example I, Part D, a mixture of 0.64 gram (20 mM.) of elemental sulfur and 2.64 grams (10 mM.) of 2,5-dibenzylthiophene [prepared by the method of Steinkopf and Hanske, Ann., 541, 238 (1939)] is heated for 12 hours at 250–300° C. On cooling, a polymeric product is obtained which is substantially poly[2,5 - thiophenediyl(diphenylvinylene)].

EXAMPLE XVII

Thermal vulcanization of poly[1,3-phenylene(diphenylvinylene)]

(A) A specimen of the poly[1,3 - phenylene(diphenylvinylene)] of Example V, which is soluble in Arochlor 1242 at 305° C., was heated for 1 hour in air at 305° C. A solubility test on the heated material showed that, as a result of the heating, the polymer was 98 percent insoluble at 305° C. in Arochlor 1242. This evidence shows that the polymer becomes cross-linked on heating.

(B) The extent of such cross-linking is dependent on the duration of heating. Another specimen of the same polymer was heated for 30 minutes in air at 305° C. and was rendered only 10 percent insoluble.

(C) The presence of air is not necessary for the cross-linking process. A carefully evacuated and degassed specimen of poly[1,3 - phenylene(diphenylvinylene)] was heated for 24 hours at 305° C. under argon and was 43 percent insoluble.

EXAMPLE XVIII

Plasticization of poly[1,3-phenylene(diphenylvinylene)]

An intimate mixture of 100 parts of poly[1,3-phenylene(diphenylvinylene)] and 15 parts of Arochlor 5460 [Monsanto Chemical Co., a chlorinated triphenyl fraction containing 60 percent of chlorine, B.P. 280–335° C. (5 mm. Hg)] was milled at 250° C. until a homogeneous rubbery mass was obtained. The rubbery mass retained its rubbery character at room temperature.

EXAMPLE XIX

Vulcanization of compounds of poly[1,3-phenylene(diphenylvinylene)]

A mixture of 100 parts of finely-divided poly[1,3-phenylene(diphenylvinylene)], 30 parts of carbon black, and 15 parts of Arochlor 5460 as the plasticizer was milled at 250° C. until a homogeneous rubbery mass was obtained. The milled compound was then heated for 1 hour at 300° C. in a suitable mold to produce a vulcanizate of poly[1,3 - phenylene(diphenylvinylene)] which was rubbery from room temperature to 500° C.

While particular embodiments of this invention are shown above, it will be understood that the invention is obviously subject to variations and modifications without departing from its broader aspects.

What is claimed is:
1. Compositions having the formula

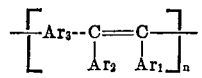

wherein $Ar_1$ and $Ar_2$ are each selected from the group consisting of monovalent carbocyclic aromatic radicals and heterocyclic aromatic radicals; $Ar_3$ is selected from the group consisting of (a) divalent mononuclear carbocyclic aromatic radicals, (b) divalent heterocyclic aromatic radicals, (c) divalent radicals comprising at least two mononuclear carbocyclic aromatic rings, and (d) divalent radicals comprising at least two heterocyclic aromatic rings, the two valences being in a 1,3-relationship to each other for (a) and (b) and stemming from the two terminal rings of $Ar_3$, when $Ar_3$ is a divalent radical comprising at least two members of the group consisting of carbocyclic aromatic rings and heterocyclic aromatic rings, from carbon atoms in each of the said terminal rings which stand in the 1,3-relationship to the remainder of the said divalent radical for (c) and (d); and $n$ is a positive integer greater than 10.

2. Poly[1,3-phenylene(diphenylvinylene)].

3. A polycondensation process which consists essentially of heating at about 200° to 500° C. a compound selected from the group consisting of (i) a mixture of compounds having the formulas (I)    $Ar_1$—$CH_2$—$Ar_3$—$CH_2$—$Ar_2$ and (II)   $Ar_1$—$CCl_2$—$Ar_3$—$CCl_2$—$Ar_2$ (ii) a compound having the formula (III)  $Ar_1$—$CH_2$—$Ar_3$—$CCl_2$—$Ar_2$ (iii) a mixture of compounds having the formulas (I)    $Ar_1$—$CH_2$—$Ar_3$—$CH_2$—$Ar_2$ and (IV)   $Ar_1$—CO—$Ar_3$—CO—$Ar_2$ and (iv) a mixture of (I) $Ar_1$—$CH_2$—$Ar_3$—$CH_2$—$Ar_2$ with elemental sulfur, wherein $Ar_1$ and $Ar_2$ are each selected from the group consisting of monovalent carbocyclic aromatic radicals and heterocyclic aromatic radicals and $Ar_3$ is selected from the group consisting of (a) divalent mononuclear carbocyclic aromatic radicals, (b) divalent heterocyclic aromatic radicals, (c) divalent radicals comprising at least two mononuclear carbocyclic aromatic rings, and (d) divalent radicals comprising at least two heterocyclic aromatic rings, the two valences being in a 1,3-relationship to each other for (a) and (b) and stemming from the two terminal rings of $Ar_3$, when Ar is a divalent radical comprising at least two members of the group consisting of carbocyclic aromatic rings and heterocyclic aromatic rings, from carbon atoms in each of the said terminal rings which stand in the 1,3-relationship to the remainder of the said divalent radical for (c) and (d).

4. The process of claim 3 wherein compound I is 1,3-dibenzylbenzene.

5. The process of claim 3 wherein compound II is 1,3-bis($\alpha,\alpha$-dichlorobenzyl)benzene.

6. The process of claim 3 wherein the polycondensation takes place in about 0.1 to about 20 parts, based on one part of the total weight of the polymer being prepared, of a high-boiling solvent.

7. The process of claim 3 wherein the reaction time is about 0.1 hour to about 100 hours.

8. The process of claim 3 wherein the reaction temperature is about 250° to 350° C. and the reaction time is about 3 to about 30 hours.

9. A process for preparing poly[1,3-phenylene(diphenylvinylene)] which consists essentially of heating equimolar amounts of 1,3-dibenzylbenzene and 1,3-bis($\alpha,\alpha$-dichlorobenzyl)benzene at about 200° to 500° C. for about 0.1 to about 100 hours initially under atmospheric pressure and finally under vacuum.

10. A process for the production of a cross-linked polymeric composition which comprises heating the composition of claim 1 for about 0.25 to 5 hours at a temperature of about 200° to 400° C.

11. The process of claim 10 wherein the heated composition is poly[1,3-phenylene(diphenylvinylene)].

12. The process of claim 11 wherein the time is about 1 to 3 hours and the temperature is about 250° to 350° C.

13. A composition comprising poly[1,3-phenylene(diphenylvinylene)], carbon black and a plasticizer.

References Cited

UNITED STATES PATENTS

| | | | |
|---|---|---|---|
| 3,340,230 | 9/1967 | Hoyt | 260—2 |
| 3,359,239 | 12/1967 | Koch et al. | 260—2 |
| 3,345,332 | 10/1967 | Hoyt et al. | 260—2 |
| 3,320,183 | 5/1967 | Brown | 260—2 |

MORRIS LIEBMAN, Primary Examiner

L. T. JACOBS, Assistant Examiner

U.S. Cl. X.R.

260—2, 30.4, 32.6